United States Patent [19]

Martus

[11] 3,798,925
[45] Mar. 26, 1974

[54] UNIVERSAL COUPLING

[76] Inventor: Donald G. Martus, 9812 Palishall Rd., Calgary, Alberta, Canada

[22] Filed: June 1, 1972

[21] Appl. No.: 258,700

[52] U.S. Cl. .......................... 64/17 SP, 64/8, 64/16
[51] Int. Cl. ............................................. F16d 3/26
[58] Field of Search .............. 64/17 SP, 17 R, 16, 8, 64/7, 18; 74/5 F

[56] References Cited
UNITED STATES PATENTS

| 849,384 | 4/1907 | Gault | 64/7 |
| 2,896,430 | 7/1959 | Olson | 64/16 |
| 2,681,552 | 6/1954 | Olson | 64/8 |
| 3,431,751 | 3/1969 | Stokely | 64/17 |
| 3,451,228 | 6/1969 | Henley | 64/16 |

Primary Examiner—Benjamin W. Wyche
Assistant Examiner—Randall Heald
Attorney, Agent, or Firm—Owen & Owen; Richard D. Emch

[57] ABSTRACT

A universal coupling is disclosed which provides articulation or rotary motion in two planes about a single axis of rotation. The coupling includes a housing containing perpendicularly opposed arcuate bearing surfaces and complementary arcuate journal surfaces. A driven shaft is connected to a bore in an innermost journal member. First arcuate bearing-journal surfaces provide a first generally horizontal articulate motion to the shaft. The second arcuate bearing-journal surfaces provide a second, generally vertical articulate motion to the shaft. The coupling provides articulation of the shaft so that a point on the axis of the shaft spaced from the coupling describes a circular path about the axis upon radial displacement of the shaft centerline at such point. More specifically, the coupling provides articulation or rotary motion in two planes about a single axis of revolution.

1 Claim, 7 Drawing Figures

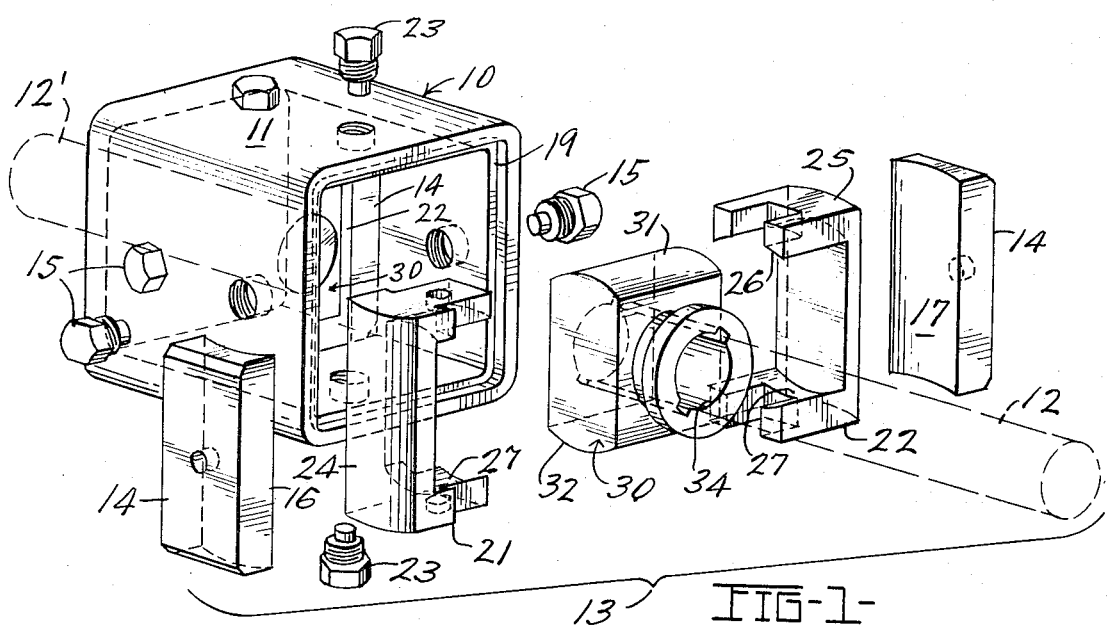
FIG-1-
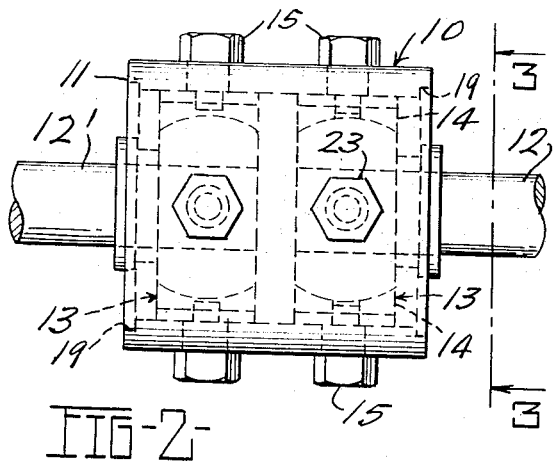
FIG-2-
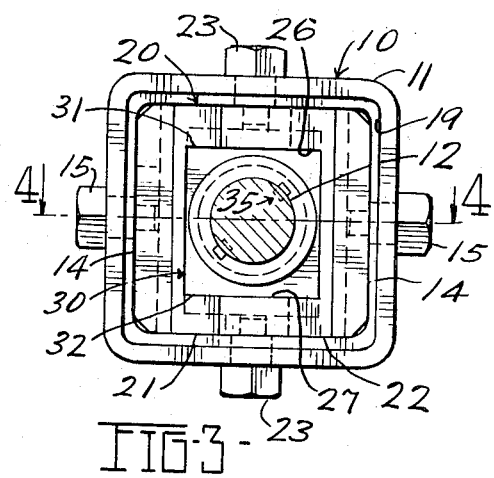
FIG-3-
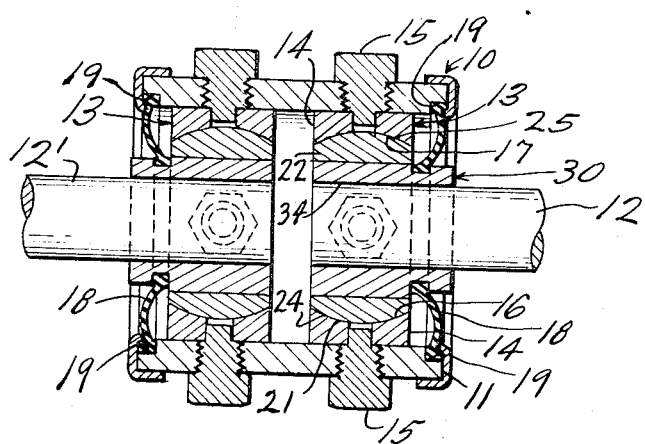
FIG-4-
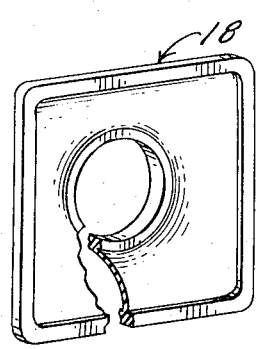
FIG-5-

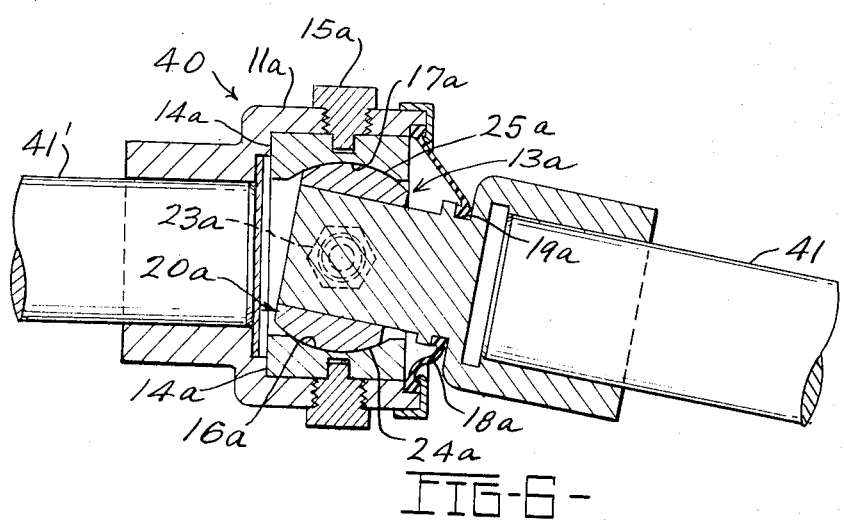
FIG-6-
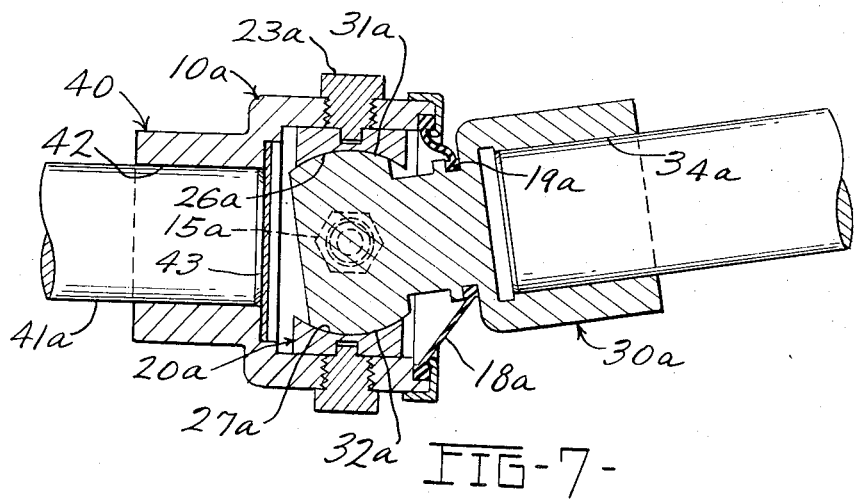
FIG-7-

3,798,925

UNIVERSAL COUPLING

BACKGROUND OF THE INVENTION

Universal couplings are generally employed to compensate for radial displacement between a prime mover and a power output shaft driven by the prime mover. Common applications of universal couplings include driven shaft connections between a differential and drive wheels of motor vehicles and eccentric shaft connections between a pump and the pump prime mover. In all cases, the universal coupling is employed to permit the transmission of power through a rotatably driven shaft which is subject to more or less extreme radial displacement relative to the prime mover. In automobiles, for example, a drive shaft must be capable of radial displacement with respect to a fixed transmission as the driven wheels encounter irregularities in road surfaces. The action of the driven wheel places radial, axial and torsional stresses on the drive shaft and the universal couplings used to provide articulation to the drive shafts.

It is necessary that a universal coupling be capable of withstanding multiple stresses and yet capable of compensating for radial movement of the driven shafts to which the universal is connected. Common universal couplings which employ, for example, U-shaped yokes pivotally connected to radial pins extending from a "spider member" are subject to failure caused by extreme torque loads placed on the drive shaft. Furthermore, these couplings are not fully articulate in that they provide for radial movement of the driven shafts only pivotally about the radial pins. As a result, the drive shaft is capable of only moving through arcs of 180° or less about the pins, with the rotating shaft in a given position. Many prior art devices are simply not suitable in high torque applications.

The present invention provides a universal coupling capable of withstanding great torsional and radial loads. At the same time, the coupling member is fully articulate, capable of providing radial motion to a driven shaft through a full 360° path.

SUMMARY OF THE INVENTION

The invention comprises a universal coupling. The coupling includes a cage housing which has first sets of outer bearing members. The interior surfaces of the outer bearing members are arcuate in shape and constitute first arcuate bearing surfaces for slidably retaining a central means having opposed first arcuate journal surfaces. The first arcuate journal surfaces on the central means are complementary with the opposed first bearing surfaces. The sliding relationship between the opposed bearing surfaces and the journal surfaces of the central means provide motion of the coupling member in a first direction. Within the central means are defined second opposed arcuate inner bearing surfaces. These surfaces are perpendicular to the first bearing surfaces. The second arcuate bearing surfaces on the central means are in complementary, sliding relationship with second arcuate journal surfaces defined on a core means. A bore within the core means receives a driven shaft. The second bearing-journal surfaces on the central means and core means provide for motion of the driven shaft in a second perpendicular direction.

BRIEF DESCRIPTION OF THE DRAWINGS

FIG. 1 is a perspective, exploded view of a universal coupling according to the present invention, with the seal omitted;

FIG. 2 is a partially diagrammatic plan view of the universal coupling of the present invention;

FIG. 3 is a partially sectional view of the universal coupling of the present invention taken along the line 3—3 of FIG. 2;

FIG. 4 is a cross-sectional view taken along the line 4—4 of FIG. 3 and rotated 90°;

FIG. 5 is a perspective view, partially broken away, of a seal element;

FIG. 6 is a horizontal sectional view similar to FIG. 4 of another embodiment of the present invention; and FIG. 7 is a vertical view of the embodiment shown in FIG. 6.

DESCRIPTION OF THE PREFERRED EMBODIMENTS

Referring to the drawings, a universal coupling 10, having a housing 11, is shown. The coupling 10 joins oppositely disposed driven shafts 12 and 12' through separate sets of articulating assemblies 13, oppositely located in the housing 11. The opposite articulating assemblies 13 are identical and provide a full range of articulation to each of the oppositely disposed shafts 12 and 12'. While the present embodiment includes two articulating assemblies 13, only one will be described below with the understanding that the second is similar to the first.

Each of the articulating assemblies 13 includes outer bearing shells 14 retained within opposite walls of the rectangular cage or housing 11 by means of positioning screws 15. While the housing 11 and shells 14 are separate units in the present embodiment, they may be formed as one unit in other embodiments. The shells 14 serve as outer bearing means in the present embodiment. First arcuate bearing surfaces 16 and 17 are defined on the opposed faces of the outer bearing shells 14.

A generally rectangular seal 18 is positioned in retaining grooves 19 (see FIG. 4). The seal is constructed from flexible materials, for examples rubber or neoprene, and serves to retain lubricants in the coupling 10 and to prevent the introduction of contaminants.

A central means, generally indicated in FIG. 3 by the reference number 20, is positioned within the cage housing 11 and in the present embodiment comprises opposed and mating U-shaped members 21 and 22 (see FIG. 1). The central means 20 is retained within the housing 11 by screws 23. The U-shaped member 21 has a first arcuate journal surface 24 and the U-shaped member 22 has a first arcuate journal surface 25. The opposed first arcuate journal surfaces 24 and 25 are in a complementary sliding relationship with the opposed bearing surfaces 16 and 17, respectively, defined by the outer bearing shells 14.

Referring to FIG. 1, the U-shaped members 21 and 22 of the central means 20 defines second opposed arcuate inner bearing surfaces 26 and 27. The arcuate inner bearing surfaces 26 and 27 are positioned in a perpendicular relationship to the first arcuate bearing surfaces 16 and 17.

The U-shaped members 21 and 22 receive core means, generally indicated by the reference number 30. The core means 30 has second arcuate journal surfaces 31 and 32 in sliding engagement with the second opposed arcuate inner bearing surfaces 26 and 27 of the central means 20.

An axial bore 34 is provided within the core means 30 for receiving one of the oppositely disposed shafts 12 or 12'. The driven shafts 12 and 12' are secured within the axial bore 34 by means of spline assemblies 35.

Pivotal movement of the central means 20, as described, relative to the outer bearing shells 14, provides a first pivotal motion, while pivotal movement of the core means 30 relative to the central means 20 provides a second pivotal motion perpendicular to the first pivotal motion. The driven shaft 12, connected to the core means 30, is movable in first and second directions corresponding with the first and second pivotal motions. Hoever, the shaft 12 is also movable in a combination of those directions through a projected angle of rotation of 360°. A point on the axis of the shaft 12 is thus movable in a circular path about the axis of rotation as the driven shaft 12 is moved in the first direction, the second direction, or combinations of the first and second directions. The driven shaft 12 is thereby displaceable radially from a plane perpendicular to the face of the universal coupling 10 to any point within the circular path.

As shown in FIGS. 2 and 4, the oppositely disposed driven shafts 12 and 12' are connected to the opposite articulating assemblies 13 within the housing 11, thereby providing full articulation of both of the shafts 12 and 12'. If either or both of the shafts 12 and 12' are radially displaced with respect to the universal coupling 10, the core means 30 is articulated, as described above, to angularly correspond to the displacement. The coupling 10 thereby provides a means of transmitting rotational torque from one driven shaft to the opposite driven shaft in addition to compensating for the displacement of those shafts.

Another embodiment of the present invention is shown in FIGS. 6 and 7. A universal coupling 10a having a housing 11a is shown. The coupling 10a joins oppositely disposed shafts 41 and 41' through a single articulating assembly 13a.

The articulating assembly 13a includes outer bearing shells 14a retained within opposite walls of the housing 11a by means of screws 15a. Of course, other means may be utilized as substitutes for the fastening screws 15a. The bearing shells 14a serve as outer bearing means. First arcuate bearing surfaces 16a and 17a are defined on the opposed faces of the outer bearing shells 14a.

A seal 18a, constructed of a flexible material, is retained in grooves 19a. As in the previous embodiment, the seal 18a serves to retain lubricant within the coupling 10a and to prevent the entrance of contaminants.

A central means 20a is positioned within the housing 11a. In the present embodiment, the central means 20a is retained within the housing 11a by screws 23a. The central means 20a has opposed first arcuate journal surfaces 24a and 25a which are in a complementary sliding relationship with the opposed bearing surfaces 16a and 17a, respectively, defined by the outer bearing shells 14a.

The central means 20a also defines second opposed arcuate inner bearing surfaces 26a and 27a. The arcuate inner bearing surfaces 26a and 27a are positioned in a perpendicular relationship to the first arcuate bearing surfaces 16a and 17a.

The central means 20a receives core means, generally indicated by the reference number 30a. The core means 30a has second arcuate journal surfaces 31a and 32a in sliding engagement with the second opposed arcuate inner bearing surfaces 26a and 27a of the central means 20a.

An axial bore 34a is defined within the core means 30a for receiving the shaft 41. Similarly, a bore 42 is provided in the housing 11a to receive the oppositely disposed shaft 41'. In the present embodiment, a sealing plug 43 is provided at the end of the bore 42 to prevent the entrance of contaminants and also to retain lubricants within the coupling 10a.

Pivotal movement of the central means 20a relative to the outer bearing shells 14a provides a first pivotal motion, while pivotal motion of the core means 30a relative to the central means 20a provides a second pivotal motion perpendicular to the first pivotal motion. The shaft 41 is movable in first and second directions corresponding with the first and second pivotal motions and also is movable in a combination of these directions throughout a projected angle of rotation of 360°.

The universal coupling, according to the present invention, has the ability to transmit power in misalignment of angularity or to transmit power upon shaft lateral displacement. It has been found that a coupling according to the present invention is able to stand high torque loads due to the relatively large and distributed bearing surfaces.

What I claim is:

1. A universal coupling comprising, in combination, cage means including a cage housing having a rectangular interior configuration, two sets of outer bearing means within said cage means, each of said outer bearing means having opposed first arcuate bearing surfaces, two sets of central means within said cage means, each of said central means having opposed first arcuate journal surfaces in complementary sliding relationship with one set of said opposed first arcuate bearing surfaces, each of said central means defining second opposed arcuate inner bearing surfaces perpendicular to said opposed first arcuate journal surfaces, two sets of core means mounted within said sets of central means, each of said core means having second arcuate journal surfaces in complementary, sliding engagement with said second, opposed arcuate bearing surfaces of one set of said central means, and an axial bore defined by each one of said core means for the reception of a driven shaft.

* * * * *